June 26, 1956 E. BACHER 2,752,159

TALKING MACHINE WITH DISC CHANGING DEVICE

Filed Jan. 16, 1952 5 Sheets-Sheet 1

INVENTOR

*Eric Backer.*

BY [signature]

ATTORNEY

June 26, 1956 E. BACHER 2,752,159

TALKING MACHINE WITH DISC CHANGING DEVICE

Filed Jan. 16, 1952 5 Sheets-Sheet 2

INVENTOR

*Eric Bacher.*

BY [signature]

ATTORNEY

June 26, 1956 E. BACHER 2,752,159

TALKING MACHINE WITH DISC CHANGING DEVICE

Filed Jan. 16, 1952 5 Sheets-Sheet 3

INVENTOR
*Eric Bacher.*

BY [signature]

ATTORNEY

June 26, 1956 E. BACHER 2,752,159

TALKING MACHINE WITH DISC CHANGING DEVICE

Filed Jan. 16, 1952 5 Sheets-Sheet 4

INVENTOR

Eric Bacher.

BY

ATTORNEY

TALKING MACHINE WITH DISC CHANGING DEVICE

Filed Jan. 16, 1952 5 Sheets-Sheet 5

INVENTOR

Eric Bacher.

BY [signature]

ATTORNEY

United States Patent Office 2,752,159

Patented June 26, 1956

2,752,159

TALKING MACHINE WITH DISC CHANGING DEVICE

Eric Bacher, Yverdon, Switzerland, assignor to Paillard S. A., Sainte-Croix, Switzerland, a company of Switzerland Application January 16, 1952, Serial No. 266,688

Claims priority, application Switzerland January 23, 1951

13 Claims. (Cl. 274—10)

The present invention has for its subject a talking machine with a disc changer allowing the automatic reproduction of discs of different diameters located above the disc turntable, and comprising a cyclic device for controlling the changing of discs and the movements of the pick-up arm.

Some talking machines of this type are already known comprising a feeler member for the diameter of discs placed in the trajectory of the fall of the latter. However, these known talking machines only allow of the selection of two diameters of different discs.

The talking machine forming the subject of the invention tends to remedy this disadvantage by allowing of the selection of an indefinite number of different diameters of discs, for example two, three or even more than three.

This talking machine is distinguished from known machines of this same type by the fact that it comprises a feeler member for the diameter of the discs capable of being moved downwards against the action of a resilient member and under the action of the weight of the disc to be played in so far as same is of a diameter greater than a minimum diameter, said feeler member having a part forming a cam and capable of co-operating successively, in proportion to its movement downwards, with stops secured to the chassis of the machine and of varying vertical lengths, each of the said stops determining, at least for the discs of a diameter greater than the minimum diameter a position for the feeler in which this is placed exactly at the outside of the edge of a disc of given diameter, an element the position of which is determined by the said part forming a cam itself determining the placing in the correct position of the pick-up arm on the edge of the disc to be played, means being provided for returning the feeler member under the discs in reserve before each disc changing operation.

Two forms of construction of the talking machine according to the invention are shown diagrammatically and by way of example in the accompanying drawings, wherein.

Figure 1:
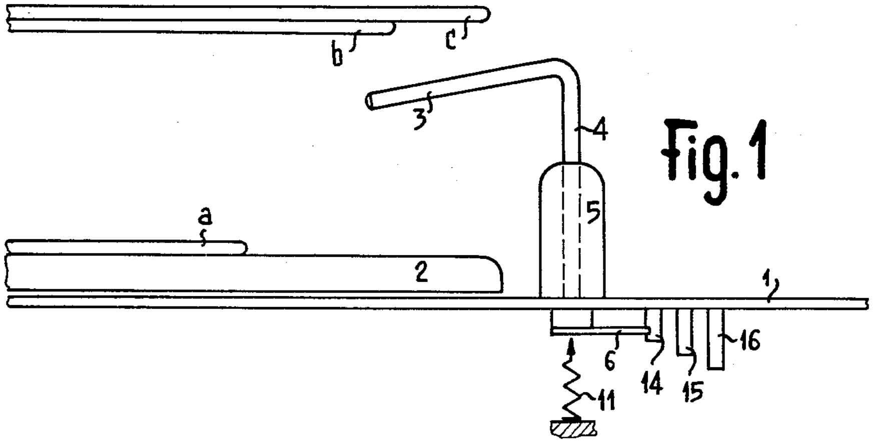
Fig. 1 is a view in elevation of the first form of construction.
Figure 2:
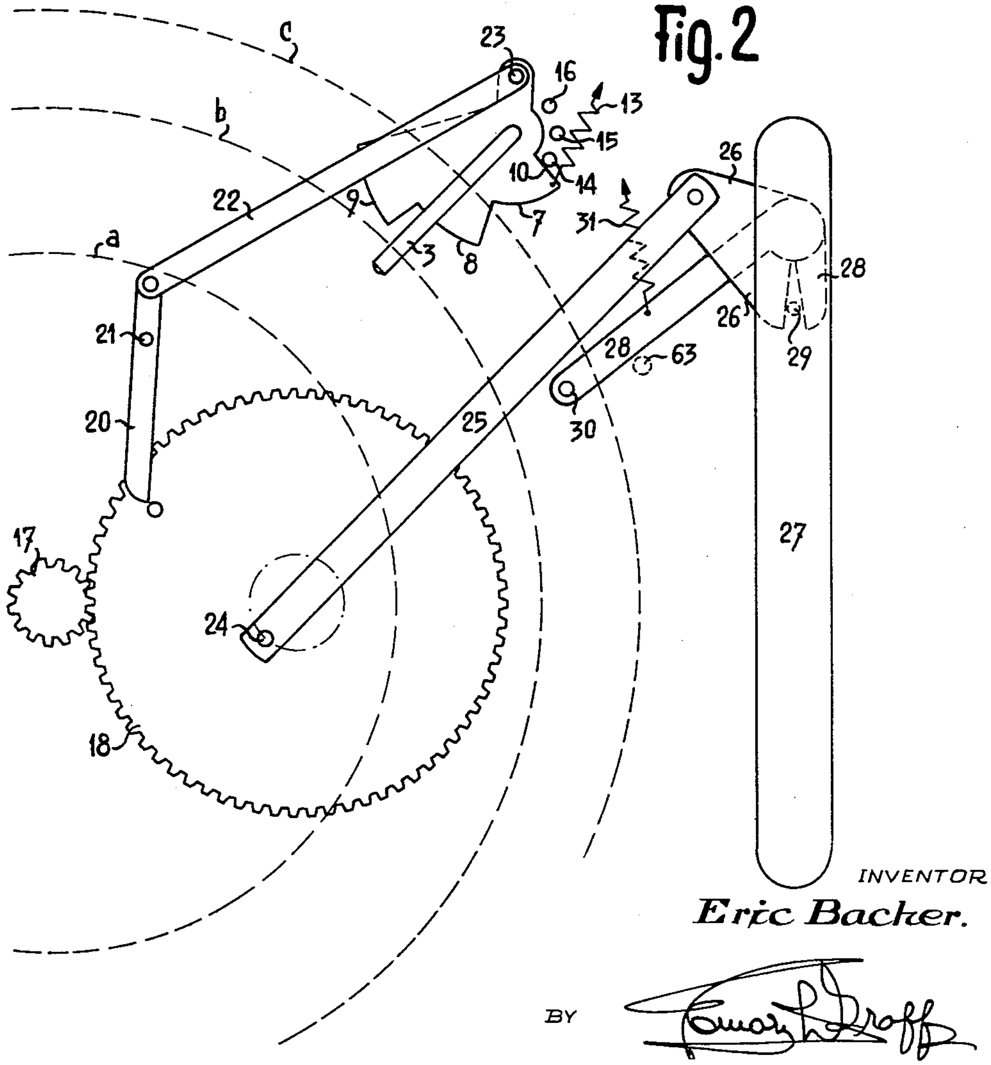
Fig. 2 is a plan view, the feeler member being in the operative position.

With reference to Figs. 1 and 2, this talking machine comprises a chassis 1 on which is pivoted a disc turntable 2 on the central shaft of which are threaded discs *a*, *b*, *c*. A device, not shown, maintains at a predetermined height above the disc turntable 2, the reserve discs *b* and *c*.

The feeler member 3 is formed by a vertical rod 4 capable of sliding vertically and pivoted in a guide 5 secured to the chassis 1. The upper part of the rod 4 is bent so as to engage between the disc turntable 2 and the reserve discs. A part forming a cam is secured to the rod 4. It is formed by a plate 6 secured to the lower portion of the rod 4.

The edge of the plate 6 has three arcs of a circle 7, 8 and 9 having as centre the pivotal axis of the feeler member 3, as also a straight line edge 10.

A spring 11 pushes the feeler member 3 upwardly by applying a pressure against an enlargement 12 at its lower end. A second spring 13 applies a torque to the rod 4.

Three stops 14, 15 and 16, extending downwardly and of varying lengths, are secured to the chassis 1 at an equal distance from the pivotal point of the rod 4. The spring 13, by applying a torque to the rod 4, tends to bring the edge 10 of the cam into contact with the first stop 14, whereby a position of the feeler member 3 is determined in which its upper bent end is directed substantially radially towards the centre of the disc turntable 2 (see Fig. 2).

The disc turntable 2 is driven by a motor (not shown). The driving shaft of the said turntable 2 carries a pinion 17 forming part of a cyclic device controlling the changings of discs and the movements of the pick-up arm.

The cyclic device comprises a wheel 18 to which is secured a finger 19, and which is engaged with the pinion 17 at each changing of a disc, by a known mechanism, so as to make a revolution during which is effected the complete cycle of changing the disc. The finger 19 is adapted to co-operate at each revolution of the wheel 18 with a lever 20 pivoted at 21 to the chassis 1 of the machine and hinged to an arm 22 itself hinged at 23 to the plate forming the cam 6.

The wheel 18 also carries an eccentric pin 24 hinged at its other end to a lever 26 adapted to control the outward movements of the pick-up arm 27.

An element which occupies a position determined by the cam 6, itself determines the correct position of the pick-up arm 27 on the edge of a disc to be played. The element is a lever 28 pivoting, like the lever 26, on the pivotal spindle of the pick-up arm 27 and carrying on one of its ends a finger 30. The two levers 26 and 28 act on a finger 29 carried by the arm 27. A spring 31, hooked to the lever 28 tends to pull the arm 27 towards the center of the disc turntable. The finger 30 is adapted to abut, under the action of the spring 31, against the part forming the cam 6, and more exactly against one of the arcs of a circle 7, 8 or 9 of the cam according to the diameter of the disc to be played and each time the pick-up arm is to be brought on to the edge of the said disc.

The operation of this talking machine is as follows:

After having placed a pile of discs to be played, of different diameters above the disc turntable, the motor driving the turntable is started and also, by means of a known clutch mechanism, the cyclic device controlling the changing of discs and the movements of the pick-up arm.

When the machine starts, the feeler member occupies the position shown in Figs. 1 and 2.

When the first disc *a* which falls on to the turntable 2 is a disc of smaller diameter than the machine can play, the fall of this disc has no effect on the feeler member 3 which is outside the path of falling of the disc *a*.

The wheel 18 which by means of the pin 24, of the link 25, and of the lever 26 has held the arm 27 at the outside of the disc turntable 2, then allows by its rotation, the spring 31 to move the lever 28 until the finger 30 carried by the latter comes to abut against the edge of the cam 6. The lever 28, during its movement, moves the arm 27 which, when the finger 30 abuts against the cam 6, is in a position above the edge of the disc *a* to be played.

After the disc *a* had been played, the cyclic device controls the withdrawal of the pick-up arm 27 by means of the members 24 to 26 and the fall of the succeeding disc *b* on to the disc turntable 2.

As the disc *b* is of an average diameter, its edge comes to bear against the feeler member 3 which recedes against the action of the spring 11 and under the action of the weight of the disc *b*.

The feeler member 3 descends as also the cam 6 which is secured thereto, until the edge 10 of the cam 6 escapes from the stop 14 and comes to bear against the adjacent stop 15.

Figure 3:
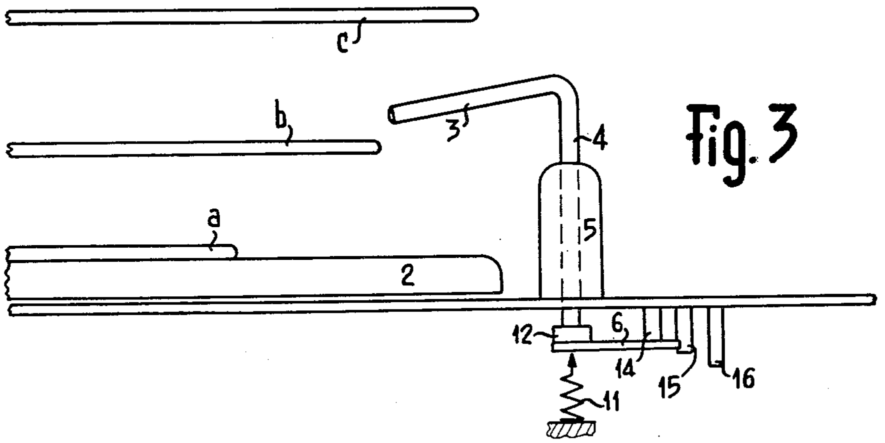
Figs. 3 and 4 are views similar to the preceding ones, showing the feeler member in the position in which it is located after having been moved by a disc of average diameter.
Figure 4:
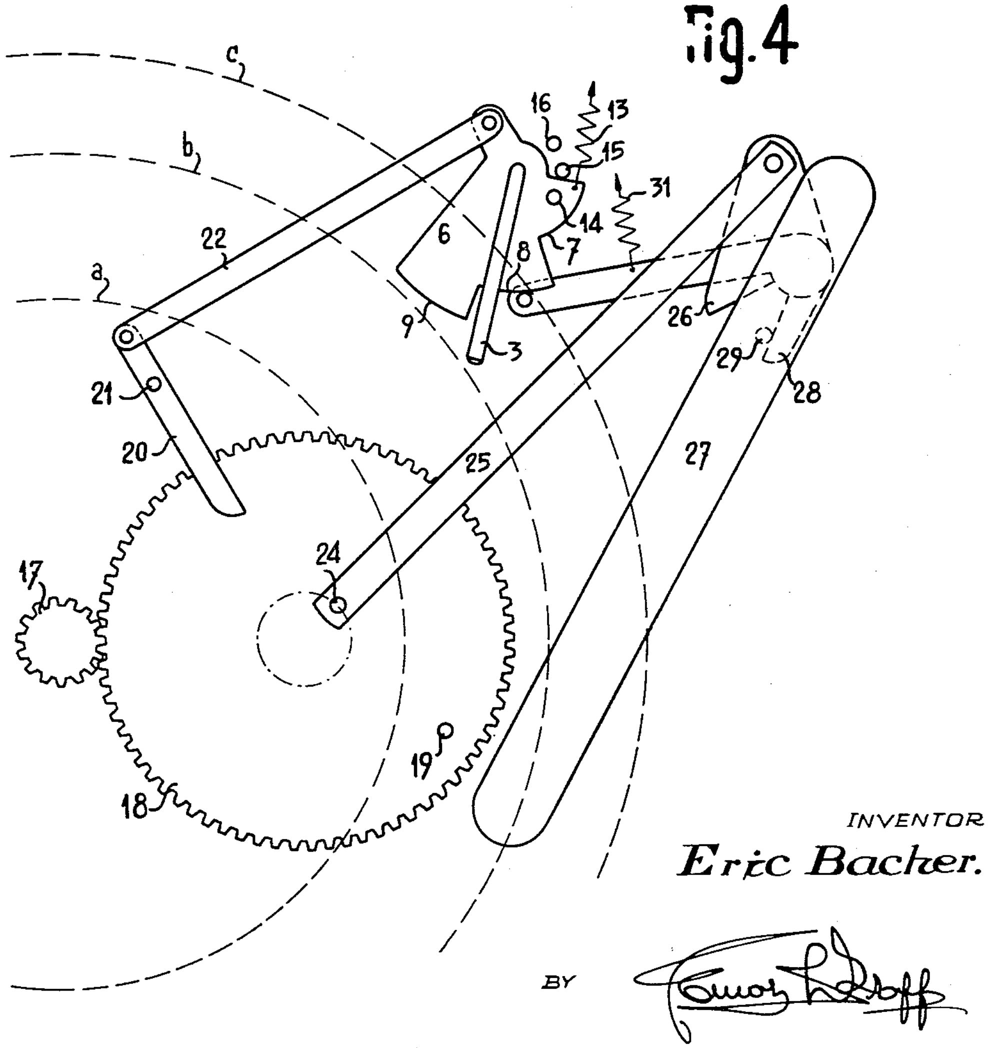

This angular movement of the feeler member is produced by the spring 13. The feeler member thus assumes the position shown in Figs. 3 and 4. As will be seen, in this position, the end of the bent part of the feeler member 3 is at the outside of the edge of the disc *b*. Thus the same can fall on to the disc turntable 2.

As for the preceding cycle, the members 18 and 24 to 26 then allow the spring 31, through the medium of the lever 28, to move the pick-up arm 27 over the edge of the disc *b*. This position of the arm 27 is determined by the finger 30 coming into contact with the edge 8 of the cam 6.

A mechanism, not shown, controls the lowering of the arm 27 for bringing its needle into the first groove of the disc *b*.

When the same has been played, the same mechanism controls the raising of the arm 27 and then the members 18 and 24 to 26 produce the withdrawal of the arm 27 from the disc turntable 2.

The rotation of the wheel 18 producing the withdrawal of the arm 27 to the outside of the turntable 2, produces, just before the fall of the following discs on the turntable 2, the return of the feeler member 3 between the reserve discs and the said turntable 2.

In fact, in the first form of construction shown, the finger 19, forming part of the means for returning the feeler member 3 into the operative position, comes into contact with the lever 20 controlling the return of the feeler member 3 under the reserve discs against the action of the spring 13, substantially at the moment at which the pin 24 moves the pick-up arm 27 into its extreme outer position.

The feeler member 3 is thus ready to come into operation determined by the diameter of the disc which is to be played.

As the following disc is a disc *c* of large diameter, the edge of this disc *c*, during its fall, comes to bear on the bent end of the rod 4 and lowers the latter against the action of the spring 11. The edge 10 of the cam 6 thus slides along the stop 14, passes off same so as to strike against the stop 15. At this moment the feeler member 3 will have rocked through a predetermined angle but a part of its rod always remains under the disc *c*. The rod 4 continues to be pushed downwards by the weight of the disc *c* until the moment at which the edge 10 escapes from the stop 15 so as to come into contact with the stop 16. At this moment the rod 4, after a further rotation through a predetermined angle, is out of the path of the disc *c* which comes to be on the disc turntable 2, or more correctly on the discs *a* and *b* already played.

The cyclic device then controls the same sequence of operations as for the two preceding discs. However, in connection with the last disc *c* of large diameter, the finger 30 of the lever 28 abuts against the edge 9 of the cam 6 thus determining the placing in correct position of the pick-up arm 27 above the edge of the disc *c*.

Figure 5:
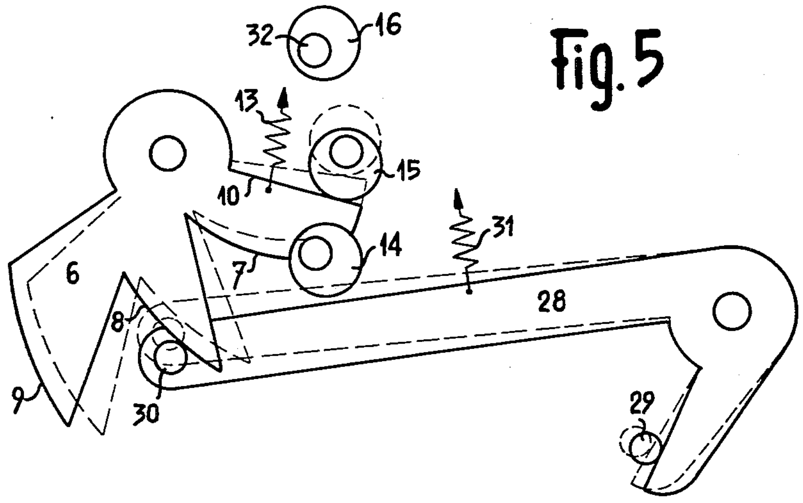
Fig. 5 is a plan view of a modification of the first form of construction.

In the first form of construction described above, the talking machine has been provided for playing in an automatic manner discs of three different diameters. In Fig. 5 is shown a modification of this first form of construction enabling the position of the pick-up arm 27 to be adjusted relatively to the edge of three kinds of discs to be played. In fact, in this modification the stops 14, 15 and 16 are secured in an adjustable manner to the chassis 1. Each stop is secured to a trunnion 32 capable of pivoting in the chassis 1. The stop proper, which is of circular cylindrical shape, is arranged eccentrically relatively to the trunnion 32. Thus, by turning the trunnion 32 through a predetermined angle, the point of contact of each stop with the edge 10 of the cam 6, is moved either in a clockwise direction or in the opposite direction relatively to the center of pivoting of the cam 6, as a result of which the point of contact of the finger 30 with the corresponding edge 7, 8 or 9 of the cam 6 is displaced. As shown in Figure 5, the edge of the cam is slightly different from that of the cam 6 in the form of construction shown in Figs. 1 to 4. The cam 6 has always three arcs of circle 7, 8, 9. However, these arcs of a circle do not have a common center coinciding with the pivotal center of the cam 6.

Once the adjustment of the stops 14, 15 and 16 has been effected, they are locked and the machine operates in a manner identical with that shown in Figs. 1 to 4.

Figure 6:
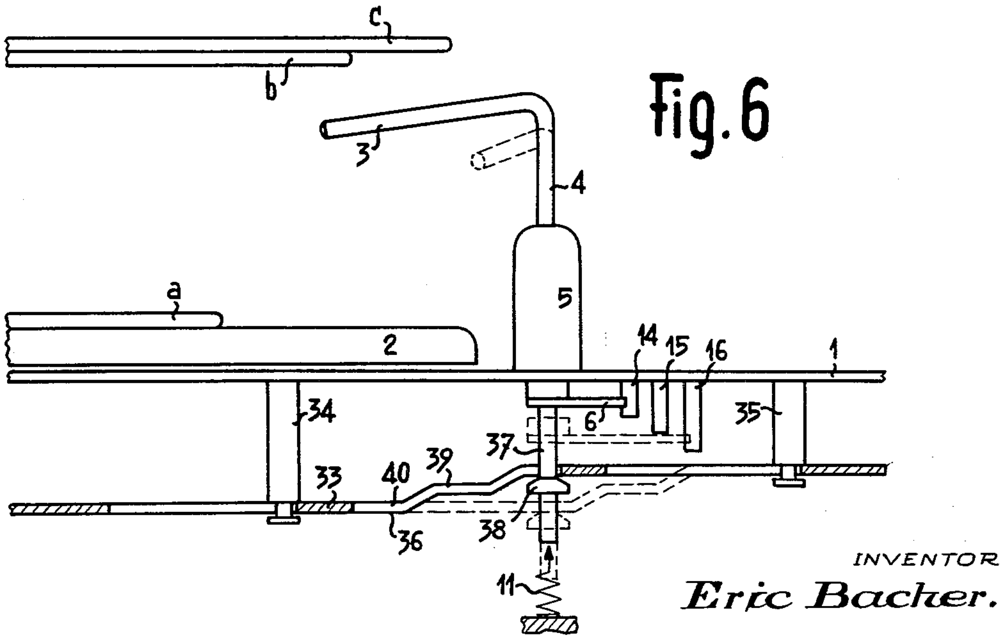
Fig. 6 shows an elevation of a device capable of being mounted on the first form of construction.

The talking machine shown in Fig. 6 is of the same type as those shown partially in Figs. 1 to 5. However, this latter machine is provided with a device enabling the feeler member 3 to be rendered operative for discs of a diameter larger than a given diameter, or to be rendered in-operative for example when it is desired to play a series of discs of the same diameter, or even to effect the easy withdrawal of played discs from the disc turntable 2.

In addition to the members already referred to above, this machine comprises a member 33 capable of being moved transversely to the rod 4 of the feeler member 3. In this form of construction, the member 33 constitutes a slide, sliding on two supports 34 and 35 secured to the chassis 1. A slot 36 enables an extension of the rod 4 to pass through the slide 33. The extension 37 has a projection or enlargement 38 adapted to bear against the slide 33, in the present case the two edges of the slot 36, the slide having a profile of the general shape of steps forming a number of bearings equal to that of the stops, in the present case three. The bearings are also spaced apart by a height substantially equal to that separating the lower ends of the stops from one another.

An operating member, not shown, is also provided for moving the slide 33 at will transversely to the rod 4.

The operation of this last device is as follows:

When it is desired, for example, to play only discs of small diameter, such as the disc *a*, the slide is placed in the position shown in Figure 6. The feeler member is thus always out of the path of fall of discs of smaller diameter and the cam is always placed in the position required for bringing the pick-up arm above the edge of the disc to be played.

The operation of the talking machine is thus similar in all respects to that described in connection with the first form of construction.

When the series of discs to be played only comprises discs of average diameter such as the disc *b*, the slide is so moved that the enlargement 38 is pushed downwards and held by the intermediate bearing 39 of the slide 33. The lowering produced by the feeler member 3 has produced rotation of same so as to bring the edge 10 of the cam 6 into contact with the stop 15. Thus the feeler member is continuously in the position shown in Figs. 3 and 4, that is to say just at the outside of the edge of discs of average diameter and the pick-up arm is always moved, at the moment of its return, towards the disc turntable 2, above the edge of the discs to be played.

When only discs of large diameter are being played, the slide is pushed toward the right in such a manner that the enlargement 38 is drawn downwardly and bears against the bearing 40. The edge 10 of the cam 6 abuts against the stop 16 and the feeler member 3 occupies the position shown in broken lines in Fig. 6. Thus, the feeler member 3 is located outside the path of fall of the disc *c* and the cam 6 controls the return of the pick-up arm 27 in such a manner that same resumes each time the same position above the edge of the discs to be played.

It is also in this last position that it is preferable to place the slide 33 when it is desired to withdraw the discs which have been played from the disc turntable 2. As the feeler member 3 is then located at the outside of discs of large diameter, it cannot in any way interfere with the unloading.

It is to be observed that when the slide is located entirely to the left as shown in Fig. 6, the machine functions in the same automatic manner for playing discs of the sizes for which provision is made. When the slide 33 is in the intermediate position for which the enlargement abuts against the bearing 39, the machine is still capable of playing, even automatically, discs of average diameter and discs of large diameter. However, it is not capable of playing discs *a* of small diameter.

Figure 7:
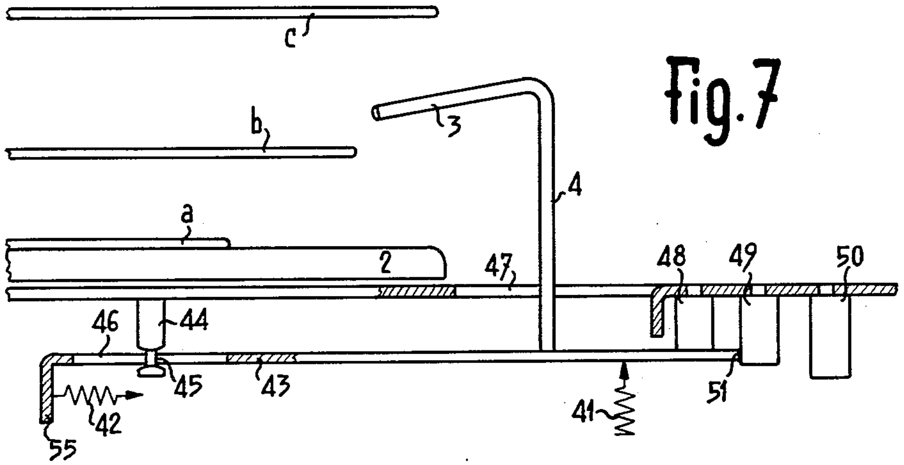
Fig. 7 is the view in elevation of the second form of construction.
Figure 8:
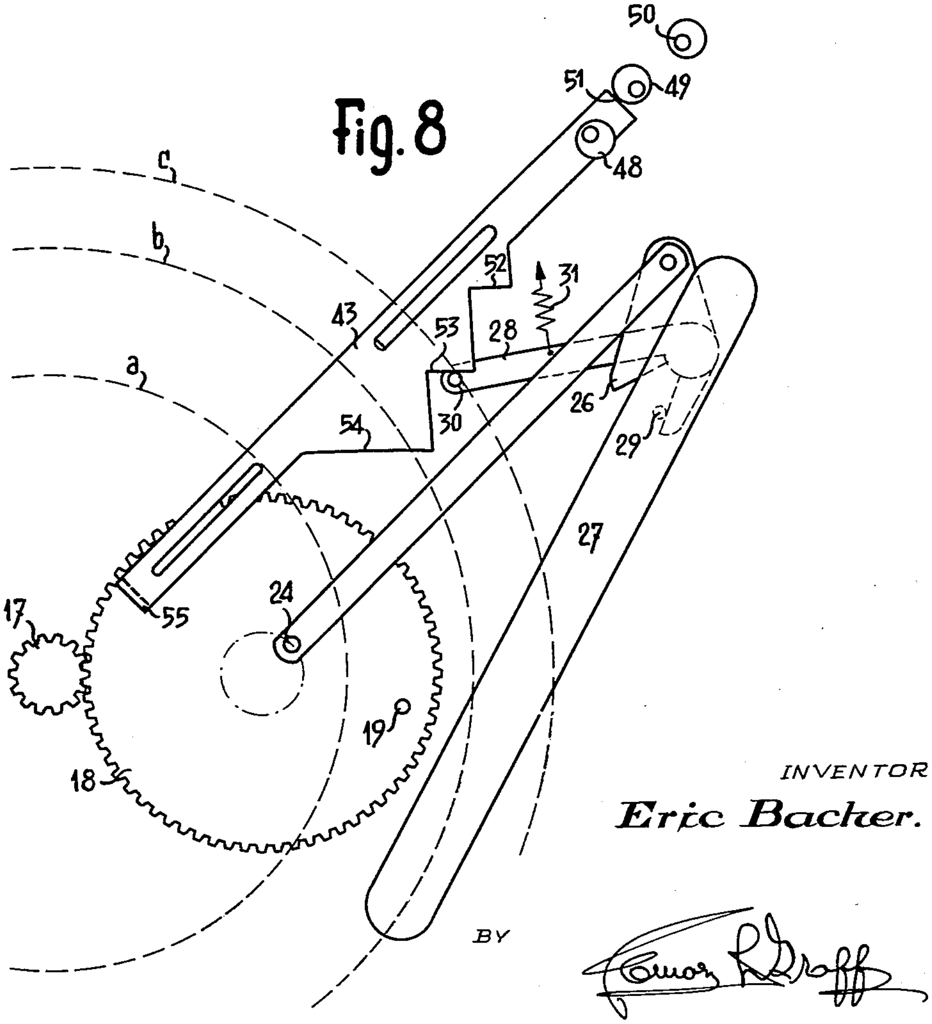
Fig. 8 is a plan view thereof.

When the slide 43 occupies the position shown in Figs. 7 and 8, the feeler member 3 is also formed by a rod 4 of which the upper part is bent. However, the feeler member 3 is no longer capable of pivoting but only capable of being pushed downwardly against the action of a resilient member, in the present case a spring 41, and radially towards the outside of the disc turntable 2 by the action of a spring 42.

In fact the rod 4 is secured at its lower end to a plate 43 capable of sliding radially relatively to the turntable 2. The plate 43 is guided, on the one hand by a support 44 secured to the chassis 1 and of which a reduced part 45 passes through a slot 46 in the plate 43, and on the other hand by the rod 4 itself which is guided in a slot 47 of the chassis 1. Adjustable stops 48, 49 and 50 are located at the end of the plate 43. They are of the same type as those shown in Fig. 5, but their trunnion axes are arranged in alignment with the plate 43 which is of elongated shape and arranged radially relatively to the disc turntable 2.

The edge 51 of the end of the plate 43, on the outside relatively to the disc turntable 2, is adapted to co-operate with the stops 48, 49 and 50.

One of the lateral edges of the plate 43 has a profile forming a cam, having notches at each edge 52, 53 and 54 and is capable of co-operating with the finger 30 of a lever 28 subjected to the action of a spring 31.

As will be seen in Fig. 8, the part of the machine comprising the pick-up arm 27 and its control levers 26 and 28 is similar to the corresponding part of the first form of construction.

A finger 19 is also provided for returning towards the center of the turntable 2 the plate forming the cam 43. For this purpose, same is provided with an angle portion 55 against which abuts the finger 19 for moving the plate 43 towards the center of the turntable 2 against the action of the spring 42.

The operation of this talking machine is as follows:

When a disc *a* of small diameter falls on to the turntable 2, the feeler member being outside the path of fall of this disc remains in its initial position, that is to say that the edge 51 remains bearing against the stop 48. In this position, when the cyclic device and the members 18, 24, 25, 26, 28, 29 and 31 control the movement of the pick-up arm 27 towards the edge of the disc to be played, the finger 30 abuts against the edge 52 of the cam 43 thus determining the correct position of the pick-up arm.

When a disc *b* of average diameter falls towards the turntable 2, its edge bears against the feeler member 3 and pushes same downwards until the edge 51 escapes from the stop 48 and comes to bear against the stop 49.

In this position the feeler member is out of the path of fall of the disc *b* and the finger 30, and by co-operating with the edge 53, as shown in Fig. 8, determines the placing of the pick-up arm 27 in the correct position above the edge of the disc *b* to be played.

When this disc has been played and just before the fall of the next disc, the finger 19 moves the plate 43 towards the center of the turntable 2 by pushing against the angle portion 55.

When the disc which then falls is a disc *c* of large diameter, this pushes the feeler member 3 downwards until the edge 51 has escaped from the stop 48, then from the stop 49 so as to come to bear against the stop 50. In this position the feeler member 3 is out of the path of fall of the disc *c* and the cam 43 is in position so that the finger 30 co-operates with the edge 54 in such a manner as to bring the pick-up arm 27 above the edge of the disc *c*.

It will be understood that constructional modifications may be made in the various forms of construction described above. For example, the stops, instead of acting on the edge of the plate forming a cam, may act on a projection provided on the surface thereof. Further, instead of using two springs 11 and 13 and 41 and 42 respectively, for producing on the one hand the return upwards of the feeler member 3 and on the other hand the rotation and translation thereof respectively, it is possible to use various other devices such as those shown in Figs. 9 and 10.

Figure 9:
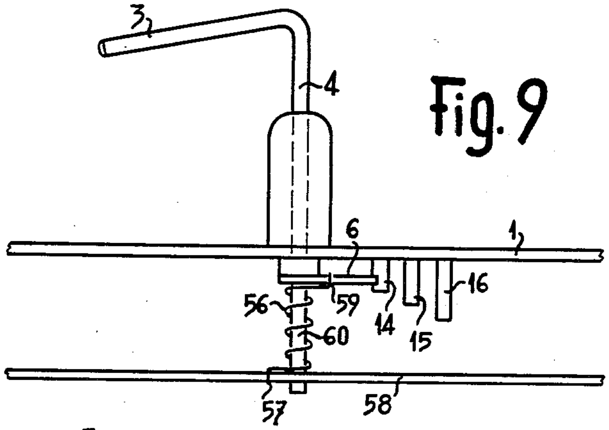
Figs. 9 to 13 show modifications of details.

In Fig. 9, the two springs 11 and 13 have been replaced by a single spring 56 operating on the one hand under compression and on the other hand under torsion. The lower end 57 of the spring 15 bears against a transom of the chassis, whilst the upper end bears against the cam 6. An extension 60 of the rod 4 serves as a guide for the spring 56.

Figure 10:
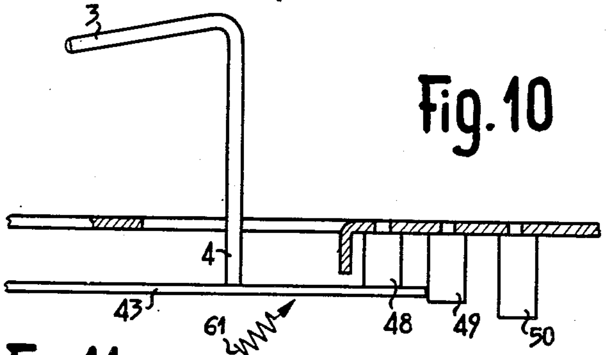

Fig. 10 shows a modification of the form of construction shown in Figs. 7 and 8. In this modification the springs 41 and 42 have been replaced by a single spring 61 arranged obliquely in such a manner that the action of the said spring is divided into two forces, one acting vertically and the other horizontally.

Figure 11:
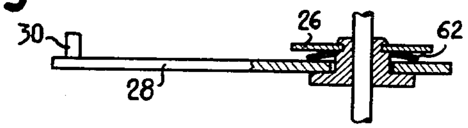

In a further modification the spring 31 may be omitted. The lever 28 is then driven by the lever 26 through the medium of a friction member 62 (Fig. 11) interposed between them. A stop 63 (Fig. 2) limits the movements of the lever 28.

Further, the slide device 33 may be replaced by a disc or a sector mounted pivotally on the chassis 1 and of which the edge or if desired an opening having a profile of the general shape of steps, the edge or opening being adapted to serve as a stop for the projection 38 of the rod 4 of the feeler member 3.

Figure 12:
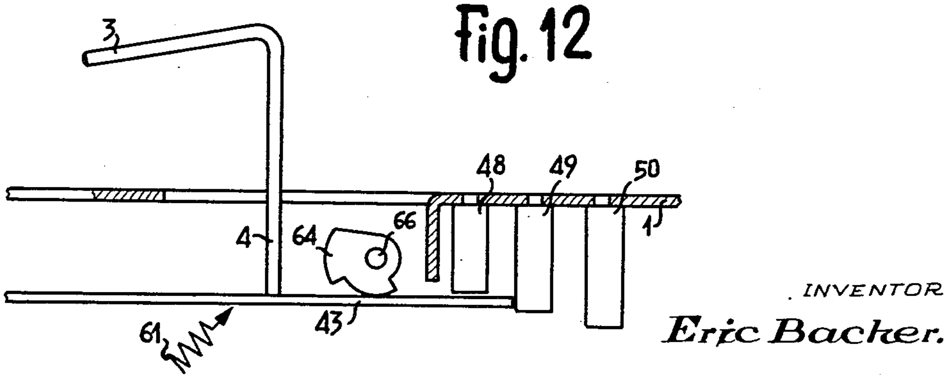
Figure 13:
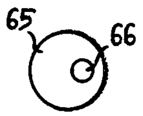

A device having an action similar to that described with reference to Fig. 6 may be provided for the second form of construction. In fact it is sufficient to provide for example, a cam 64 (Fig. 12), an eccentric 65 (Fig. 13) or an inclined plane above the plate 43 if necessary between the rod 4 and the stop 48, for holding this at a determined level enabling it to co-operate either with all the stops 48 to 50, or with the stops 49 and 50, or solely with the stop 50.

In the case of an eccentric 65 or a cam 64, the pivotal axis 66 of this is horizontal and preferably arranged transversely relatively to the plate 43.

In the various forms of construction described and shown, always three stops 14, 15 and 16 or 48, 49 and 50 are referred to; however, it will be understood that when it is desired to be able to play with a talking machine more than three types of discs, each type being of a diameter different from the others, it is then sufficient to provide more than three stops and an equal number of edges such as 7 to 9 or 52 to 54 on the plate forming the cam 6 respectively 43.

I claim:

1. In a talking machine having disc changing means for automatic reproduction of discs of different diameters previously stored above a disc turntable, the disc changing means comprising a cyclic device controlling the change of discs and the movement of a pick-up arm, the combination comprising, a chassis, a feeler movably mounted on the chassis and moved by a falling disc exceeding a certain diameter downwardly and outwardly of the path of the falling disc, a plate member rigid and movable with the feeler and including a plurality of cams, the feeler and plate member being urged upwardly and horizontally outwardly of the turntable axis, spaced stops, one for each cam, mounted on the lower chassis side and of different vertical lengths and successively engaged by the plate member during its downward movement caused by the weight of a disc exceeding a certain diameter and dropping on the turntable and thereby depressing and horizontally deflecting the feeler and plate member outwardly of the turntable axis depending on the diameter of the dropping disc, a pick-up arm pivoted on the chassis, a lever pivoted on the chassis and urged to engage the pick-up arm to swing same toward the center of the disc to be played, the lever being controlled by one of the cams on the plate member according to the position thereof determined by the diameter of the dropping disc to be played, means controlled by the cyclic device and swinging the pick-up arm away from the center of a disc played to a position outside the path of the next dropping disc to be played prior to engagement of the feeler by such disc, and means intermittently operable by the cyclic device and moving the feeler to a position below the discs stored and above the turntable.

2. The combination of claim 1 and wherein the stops are horizontally adjustable to thereby determine the point at which the pick-up needle engages the disc.

3. The combination of claim 1 and wherein the feeler is a rod and includes a vertical part slidably and pivotally mounted on the chassis and an upper bent part engageable with a disc and prior to the fall thereof disposed below the reserve discs and wherein the plate and feeler is urged by at least one spring upwardly and to a predetermined angular position.

4. The combination according to claim 1 and wherein the means swinging the pick-up arm away from the turntable center is a lever pivoted on the vertical pivot axis of the pick-up arm and the pick-up arm has a finger engaged by one end of the lever.

5. The combination according to claim 1 and wherein the means moving the feeler below the stored discs comprises a lever pivoted on the chassis, a link at one end pivoted to an end of the lever and at the other end pivoted to the plate member and wherein the cyclic device includes a wheel carrying a projection during rotation of the wheel engageable with the other end of the lever.

6. The combination according to claim 1 and also comprising means rendering the feeler inoperative for discs having a diameter less than a predetermined diameter and for moving the feeler to a position permitting an easy removal of discs played from the turntable.

7. The combination according to claim 1 and also comprising operable means rendering the feeler inoperative for discs having a diameter less than a predetermined diameter and for moving the feeler to a position facilitating easy removal of discs played, the operable means including a member slidable transversely of the feeler and having steps of a number equal to that of the stops and of a horizontal spacing like that of the stops and differing in height like the stops and cooperating with a shoulder on the feeler for holding same at a height insuring the cam carrying plate to abut a selected one of the stops determining the position of the pick-up arm on the disc of the largest diameter.

8. The combination according to claim 1 and wherein the feeler consists of a vertical part and an upper part bent relative to the vertical part and disposable between the turntable and stored discs and the cam carrying plate is secured to the lower end of the vertical part and slidable in the chassis substantially radially of the turntable, and wherein the plate is urged by a spring toward one of the stops.

9. The combination according to claim 1 and wherein the feeler consists of a vertical part and an upper part bent relative to the vertical part and disposable between the turntable and stored discs and the cam carrying plate is secured to the lower end of the vertical part and slidable in the chassis substantially radially of the turntable, and wherein the plate is urged by a spring toward one of the stops, the cams on the plate defining notches, and wherein the means for moving the pick-up arm toward the turntable center carries a finger received in one of the notches.

10. The combination according to claim 1 and wherein the feeler is a rod having a vertical portion and a portion bent relative thereto to extend between the turntable and the stored discs, and the plate member is slidable on the chassis radially of the turntable and has notches between the cams and the means swinging the pick-up arm toward the turntable includes a finger received in one of the notches and also has an angle portion and the cyclic device includes a projection engaging the angle portion to restore the feeler to a position between the turntable and reserve discs.

11. The combination according to claim 1 and also comprising an operable means rendering the feeler inoperative for discs of a diameter less than a predetermined diameter and for moving the feeler to a position permitting an easy removal of the discs, and wherein the feeler is a rod having a vertical portion and another portion bent relative thereto, and the plate is slidable on the chassis and radially of the turntable.

12. The combination according to claim 1 and also comprising operable means rendering the feeler inoperative for discs of a diameter less than a predetermined diameter and comprising a cam carried by the chassis and rotatable about a horizontal axis.

13. The combination according to claim 1 and also comprising means rendering the feeler inoperative for discs of a diameter less than a predetermined diameter and for moving the feeler to a position permitting an easy removal of discs played and comprising an eccentric carried by the chassis and having a horizontal axis of rotation.

References Cited in the file of this patent

UNITED STATES PATENTS

| | | |
|---|---|---|
| 2,090,746 | Compare | Aug. 24, 1937 |
| 2,488,260 | Ascoli | Nov. 15, 1949 |
| 2,537,752 | Hall | Jan. 9, 1951 |

FOREIGN PATENTS

| | | |
|---|---|---|
| 320,516 | Great Britain | Oct. 17, 1929 |